Dec. 27, 1927.
L. P. DRAPER
1,654,323
BUCK RAKE ATTACHMENT FOR TRACTORS
Filed July 2, 1926
2 Sheets-Sheet 1
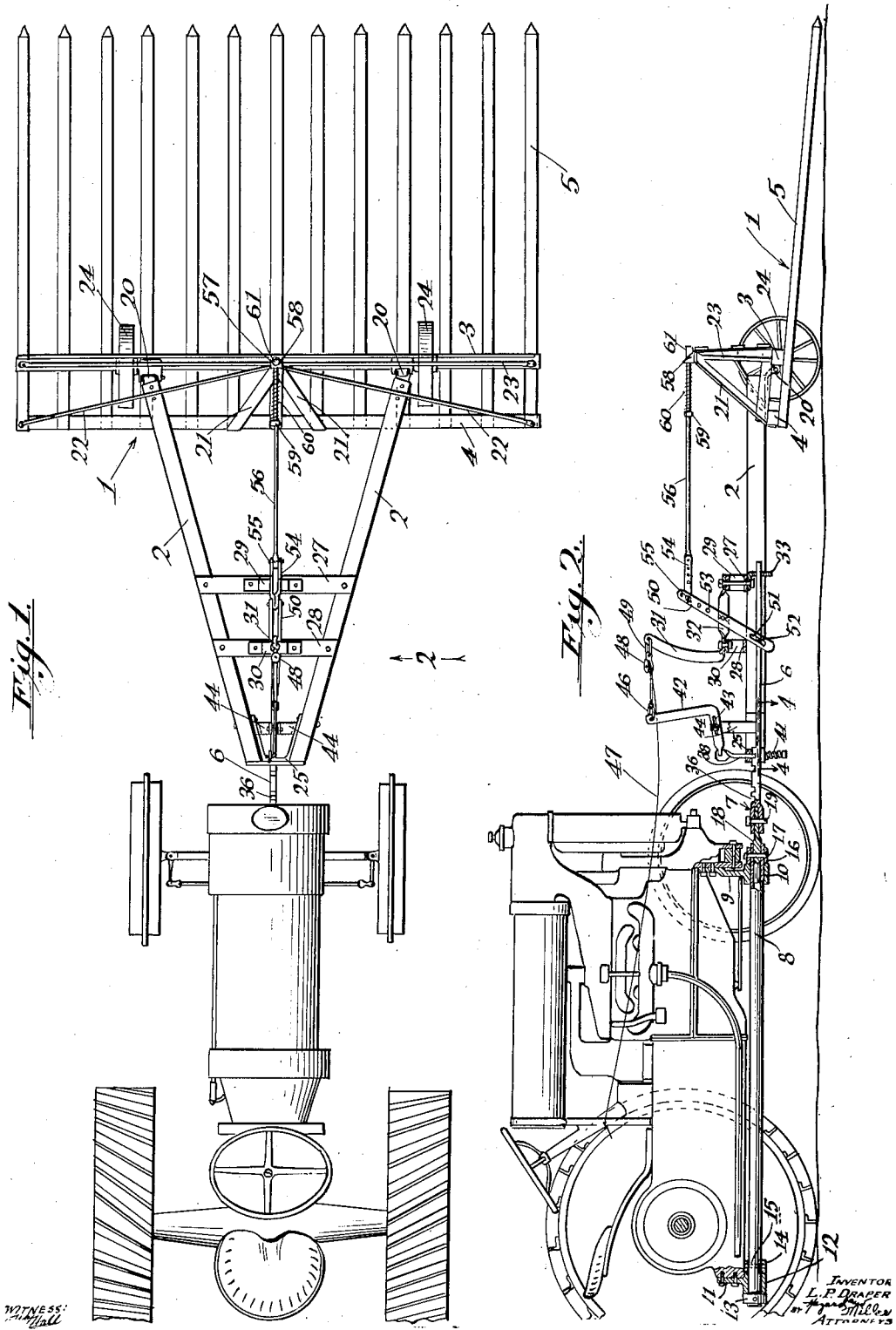

Dec. 27, 1927.

L. P. DRAPER 1,654,323

BUCK RAKE ATTACHMENT FOR TRACTORS

Filed July 2, 1926     2 Sheets-Sheet 2

Inventor
Lawrence P. Draper
by Hazard and Miller
Attorneys.

Patented Dec. 27, 1927.

1,654,323

UNITED STATES PATENT OFFICE.

LAWRENCE P. DRAPER, OF MESA, ARIZONA.

BUCK-RAKE ATTACHMENT FOR TRACTORS.

Application filed July 2, 1926. Serial No. 120,106.

My invention is a buck rake attachment for tractors.

An object of my invention is the construction of a buck rake which may be attached to and operated from a tractor and thereby carry heavier loads of hay or similar material and handle same more expeditiously than with horse operated buck rakes.

A particular object of my invention is mounting the buck rake structure on the front of a tractor with mechanism for raising and lowering the teeth of the rake, these being controlled by the operator of the tractor, the force or lifting power being derived from the movement of the tractor.

My invention also involves the feature of steering the buck rake by having a hinged connection to the tractor so that swinging the tractor will also turn the buck rake.

In constructing my invention I utilize a pair of longitudinally extending attachment bars which at their outer ends are fastened to the front tooth bar from which the rake teeth extend forwardly. These bars at their rear end are slidably mounted on a tongue which latter extends forwardly from the tractor. The rake itself is mounted on wheels and thereby supported above the ground, the teeth being tiltable up and down to lift hay or the like.

My invention will be more readily understood from the following description and drawings, in which:

Figure 1 is a plan view of my buck rake connected to a tractor;

Fig. 2 is a side elevation partly in section of Fig. 1, as if taken in the direction of the arrow 2;

Figure 3:
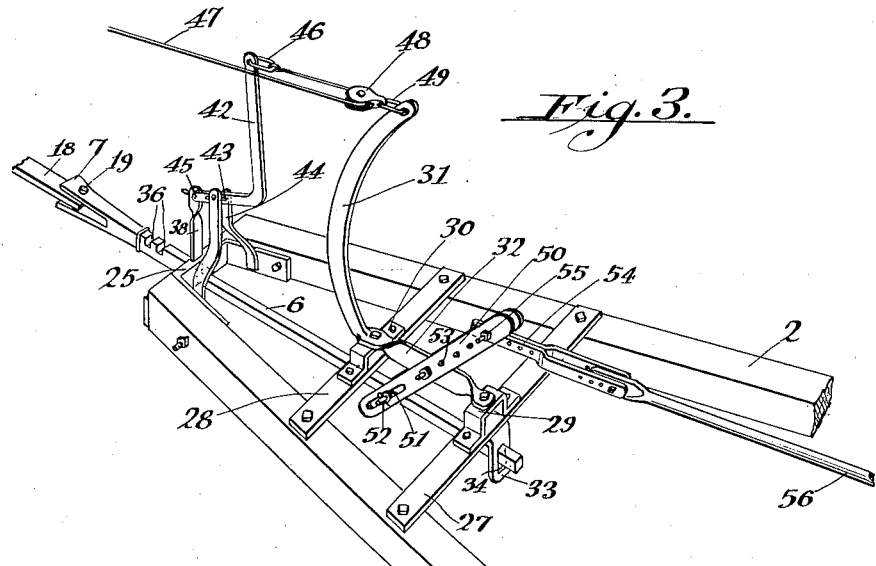
Fig. 3 is a perspective view showing part of the attachment bars and the tongue connection to the tractor with the operating gear.
Figure 4:
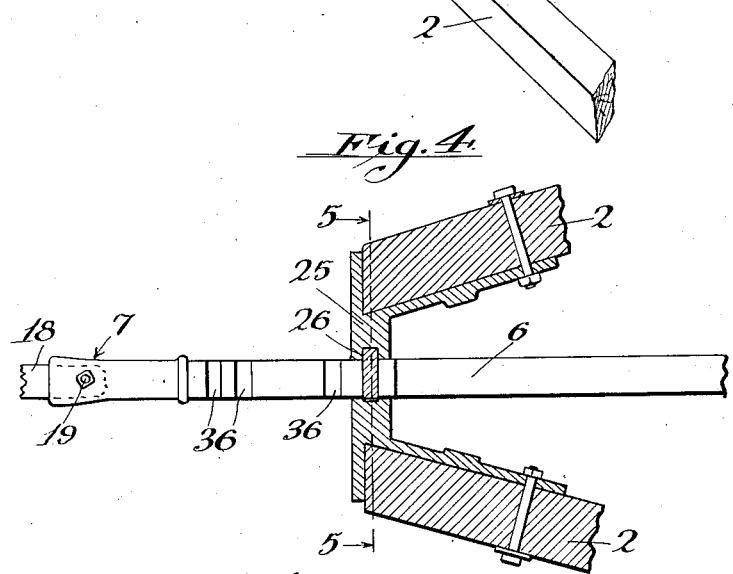
Fig. 4 is a horizontal section of part of the device on the line 4—4 of Fig. 2, taken in the direction of the arrows.
Figure 5:
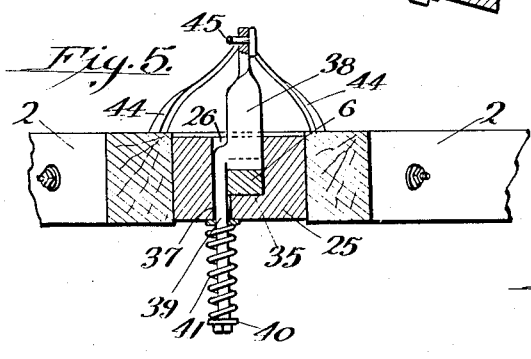
Fig. 5 is a cross section through a connecting head, taken on the line 5—5 of Fig. 4, in the direction of the arrows, showing the locking bolt.

The general construction and assembly of the tractor and buck rake is substantially as follows:

The rake as a whole is designated by the numeral 1 having longitudinally extending attachment bars 2, these being spaced wide apart at their forward ends and contracted towards the tractor. The rake has a front tooth bar 3, a rear tooth bar 4 and teeth 5 extending forward of such bars. The attachment bars are slidably connected by a suitable framing hereunder set forth, to a tongue 6, this latter having a hinge or pivoted connection 7 with a brace rod 8 extending between the front and rear axles of the tractor. By this construction the tractor may be utilized to shove the buck rake and to steer it in different directions in accordance with the direction of movement of the tractor. Such construction is shown generally in Figs. 1 and 2.

The brace rod 8 is attached to the tractor substantially as follows:

A front bracket 9 is bolted to the frame of the tractor and has preferably a cylindrical passage or opening 10 extending therethrough. A rear bracket 11 is secured to the rear part of the tractor, preferably to the rear axle housing and has a cylindrical opening 12 therethrough. The brace rod 8 is preferably tubular and has a nut 13 threaded on the rear end and a collar 14 positioned on the forward side of the bracket 11 with a pin 15 securing such collar in position.

A collar 16 having a pin 17 therethrough is mounted on the forward end of the brace rod in front of the bracket 9, this pin engaging through a bar 18 which fits internally in the brace rod. The pivot connection 7 between the tongue 6 and the rod 18 is formed by means of a pivot pin 19.

The construction of the rake features of the invention is substantially as follows, being illustrated particularly in Figs. 1 and 2:

The attachment bars 2 are secured to the front tooth bar 3 by means of a hinged connection 20 which may be of any suitable character. A framing 21 preferably of metal connects the rear tooth bar 4 and the front tooth bar 3, such framing extending to a sufficient elevation above the said bars to get the proper leverage for handling the load as hereunder described. Tie bars 22 and 23 extend from the center framing 21 to the outer ends of the bars 3 and 4 and form braces. The wheels 24 are preferably mounted on or journaled in alinement with the front tooth bar 3.

The particular tilting or lifting arrangement is substantially as follows:

A strong head structure 25 preferably made of a casting, is secured to the rear ends of the attachment bars 2 and has a vertical slot 26 therein. Cross bars 27 and 28 are secured to the attachment bars and have brackets 29 and 30 secured thereto. A rigid brace arm 31 having an extension 32 connected to the braces 29 and 30 extends upwardly vertically to a suitable elevation. A downwardly depending bracket 33 having an opening 34 therethrough accommodates the forward end of the tongue 6. The rear end of the tongue slides through a longitudinal opening 35 in the head 25. This tongue has a series of notches 36 adjacent its rearward end. The head 25 also has an offset vertical opening 37 in alinement with the opening 26 and extending through to the base thereof, the opening 26 ending at the longitudinal opening 35.

A slidable bolt 38 is mounted in the opening 26 and has an extension end 39 passing through the vertical opening 37. This end has a washer 40 secured by a nut and provided with a coil spring 41 tensioned between the bottom of the head 25 and the washer 40, tending to hold the bolt 38 downwardly. A bell crank 42 having a slot 43 therein is pivoted on a bracket 44 extending upwardly from the rear end of the attachment bars. One end of this bell crank has a pivotal connection 45 with the upper end of the bolt 38. The other end has an eye 46 through which extends an operating cable 47, this cable passing through a pulley block 48 connected by a pin to the upper end 49 of the brace arm 31.

An adjustable lever 50 is pivoted to the extension 32 of the brace arm 31 and by means of a slot 51 and a pin 52 the lower end of this lever is connected to the tongue 6. The upper end of the lever has a series of apertures 53 to which is connected a link 54 by means of a pin 55. This link is connected to an operating rod 56 which extends forwardly and passes through an opening 57 in a block 58 attached to the upper part of the frame 21. An adjustable collar 59 forms an abutment for a spring 60 coiled on the operating rod, this spring bearing on the back of the block 58. The forward end of the rod has a nut 61 bearing against the front face of the block 58.

The manner of operating my buck rake is substantially as follows:

Presuming the rake is in the position shown in Figs. 1 and 2 with the teeth adjacent the ground, the bolt 38 is illustrated as engaging in one of the notches 36 on the tongue and being held downwardly therein by means of the spring 41. In this position the buck rake may be forced forwardly by driving the tractor. The thrust against the tractor is taken up by both the front and rear structures thereof, by means of the brace rod 8 and the manner in which this rod is connected to the tractor as above described. When it is desired to elevate the teeth slightly at their forward end, the cable 47 is pulled, the rear end of the cable being illustrated as being connected to the tractor convenient to the operator. This gives a pull forward on the upper end of the bell crank 42 and elevates the bolt 38 against the tension of the spring 41. The forward thrust of the tractor then drives the tongue 6 forward in relation to the rake proper, the tongue sliding through the opening 34 in the bracket 33. This motion rocks the lever 50, drawing the upper end rearwardly and exerting a tension on the operating rod 56. This rod draws backwardly on the block 58 connected to the frame 21 and thereby rocks the front and rear tooth bars 3 and 4 and the teeth 5, elevating the same slightly.

The forward motion of the tongue brings another notch in register with the bolt 38 and when in register the spring 41 quickly snaps the bolt into position, thereby locking the rake teeth at a slight and the desired elevation. When a complete load has been obtained the cord 47 may be pulled and maintained under tension for a short time in which case the forward motion of the tractor causes the thrusting forward of the tongue 6 and a further elevation or tilting upwardly of the teeth 5 in the manner above described. The tension on the cord may be maintained until the bolt 38 drops into one of the rearward notches 36, thus holding the load elevated and it may then be moved to the desired position, such as a stacker.

The steering of a buck rake having my attachment to the tractor is quite simple in that in the first movement from traveling straight ahead the steering wheels of the tractor are turned to carry same in a reverse direction to that in which it is intended to turn the rake. The wheels are then reversed in direction to follow the buck rake either in a curve or a straight path as desired. It will be seen therefore, that with my construction a sharp turn can be made.

In steering the buck rake, presuming the steering wheels are turned to steer the tractor to the left, this will turn the buck rake to the right and vice versa. It will thus be seen that a quick turn may be made without substantially moving the buck rake in a forward direction. Also the reverse action may be had by backing the tractor and turning the wheels in the direction to be steered. It will be noted that the attachment bars 2 diverge from a position near the pivotal connection of the tractor and the tongue, and that these engage the buck rake adjacent the wheels. Therefore, in turning the thrust and pull is transmitted substantially directly from the vertical pivotal point of the connection to the wheels of the buck rake, thus turning such rake without a twisting action on the tongue and without warping the buck rake.

It is immaterial to what type of tractor my buck rake is attached, and as tractors vary considerably in their structural features, it may be necessary to modify the connection to suit different tractors. Moreover, it may be desirable to change the structure of the buck rake itself in general or specific features to suit different circumstances. Such changes and modifications however, would be within the spirit of my invention as set forth in the description, drawings and claims.

Having described my invention, what I claim is:

1. A buck rake comprising in combination a tractor, a single brace rod connecting the front and rear portions of the tractor, a tongue vertically pivotally connected to the brace rod, a buck rake structure having tiltable teeth, the rake structure being slidably mounted in relation to the tongue and means operated by the sliding movement of the tongue relative to the rake structure to tilt the teeth.

2. A buck rake as claimed in claim 1, the means to tilt the teeth comprising a lever having a fixed pivotal connection on the rake structure, one end of the lever being operatively connected to the tongue, an operating rod connecting the other end of the lever, and means connecting the operating rod to the tiltable teeth.

3. A buck rake as claimed in claim 1, the means to tilt the teeth comprising a lever having a fixed pivotal connection on the rake structure, one end of the lever being operatively connected to the tongue, an operating rod connecting the other end of the lever, means connecting the operating rod to the tiltable teeth, and having a locking bolt, the tongue having notches to engage said bolt, and means to release the bolt from the notches to allow sliding movement of the tongue and movement of the said lever.

4. A buck rake comprising in combination a rake structure having wheels, transverse tooth bars having rake teeth connected thereto, converging attachment bars operatively connected to one of the tooth bars to allow tilting motion of the rake teeth, a head connected to the rear end of the attachment bars, a tongue slidably mounted in the head and in a guide structure secured to the attachment bars, a brace bar extending upwardly from the attachment bars, a bolt slidably mounted in the head, there being notches in the tongue to engage said bolt, a lever connected to the bolt, a cable attached to the lever passing over a pulley connected to the brace bar, adapted to release the bolt from the notches, and means operated by the sliding movement of the tongue to tilt the rake structure.

5. A buck rake as claimed in claim 4, in which the means to tilt the rake structure operated from the tongue comprises a lever having a fixed pivotal point, one end of the lever being connected to the tongue, an operating rod operatively connected to the other end of the lever, and a frame connected to the rake structure, said operating rod being connected to said frame.

6. A buck rake comprising in combination a rake structure having transverse tooth bars, wheels operatively connected to one of said bars, teeth extending forwardly from the bars, a frame extending upwardly from the tooth bars, converging attachment bars extending rearwardly from one of the tooth bars and being hingedly connected thereto, a head secured to the rear ends of the attachment bars, a tongue slidably mounted in the head and sliding through a fixed structure connected to the attachment bars, the tongue having a series of notches, a lever pivotally mounted in a fixed structure connected to the attachment bars, one end of the lever being connected to the tongue, an operating rod connecting the other end of the lever to the said frame, a locking bolt slidably mounted in the head, and means to operate said bolt.

7. A buck rake as claimed in claim 6, the bolt having a downward extension and a spring mounted thereon normally tensioned to draw the bolt into engagement with the notches.

8. A buck rake as claimed in claim 6, a tractor, means forming a vertical pivotal connection between the tongue and the tractor, a cable extending from the tractor through a pulley on a fixed structure connected to the attachment bars, and means connected to the free end of the cable to actuate the said bolt.

9. In a buck rake, a tractor, a pair of brackets connected to the forward and rearward ends thereof, a single brace rod connected between said brackets, a tongue vertically pivotally connected to the forward end of the brace rod, a buck rake structure slidably mounted in relation to the tongue, forward of the tractor, means to latch the buck rake in different positions longitudinally of the tongue, the buck rake structure having teeth, and means to tilt same in accordance with the position of the buck rake.

10. In a buck rake construction, a pair of diverging attachment bars, means connecting said bars together at the converging end, a slidable tongue extending through said end, means to vertically pivotally connect said tongue to a tractor, means to connect the divergent ends of the bars to a buck rake, means to adjust and retain the tongue in any desired position, and means actuated by the tongue adapted to control the operation of the buck rake.

11. In a buck rake construction, a pair of diverging attachment bars, a head structure securing said bars together at their converging end, cross bars connecting the attachment bars, a tongue having a series of notches slidable through the head and the cross bars, means on one end of the tongue to allow vertical pivotal connection with a tractor or the like, a slidable bolt engaging the notches, means to release the bolt from the notches and allow sliding of the tongue, means at the divergent end of the bars adapted to allow attachment to a buck rake, and means operated by the tongue adapted to control the buck rake.

12. A buck rake comprising in combination a rake structure having attachment bars, a rake element having rake teeth tiltably mounted at the forward end of said bars, means connecting the attachment bars to a tractor, means to tilt the teeth element by the forward motion of the tractor relative to the attachment bars, the means operatively connecting the attachment bars and the tractor comprising a tongue connected to the tractor, a structure connected to the attachment bars through which the tongue has longitudinal sliding movement, and means mounted on the attachment bars having locking engagement with the tongue.

13. A buck rake comprising in combination a rake structure having attachment bars, a rake element having rake teeth tiltably mounted at the forward end of said bars, means connecting the attachment bars to a tractor, means to tilt the teeth element by the forward motion of the tractor relative to the attachment bars, the means operatively connecting the attachment bars and the tractor comprising a tongue connected to the tractor, a structure connected to the attachment bars through which the tongue has longitudinal sliding movement, means mounted on the attachment bars having locking engagement with the tongue, the tongue being provided with notches, the engaging means with the tongue comprising a slidable bolt, means normally drawing the bolt into the notches, a lever connected with the bolt, and means to operate said lever from the tractor.

In testimony whereof I have signed my name to this specification.

LAWRENCE P. DRAPER.